United States Patent
Yom-Tov et al.

(10) Patent No.: US 10,922,405 B2
(45) Date of Patent: Feb. 16, 2021

(54) DATA GENERATION FOR DATA PROTECTION

(71) Applicant: Microsoft Technology Licensing, LLC, Redmond, WA (US)

(72) Inventors: Elad Yom-Tov, Hoshaya (IL); Hani Hana Neuvirth, Redmond, WA (US); Ron Matchoro, Zipori Shirr (IL); Nir Rosenfeld, Somerville, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 93 days.

(21) Appl. No.: 15/800,559

(22) Filed: Nov. 1, 2017

(65) Prior Publication Data

US 2019/0130099 A1 May 2, 2019

(51) Int. Cl.
*G06F 21/55* (2013.01)
*G06F 21/64* (2013.01)
*H04L 29/06* (2006.01)
*G06F 16/2455* (2019.01)
*G06F 21/62* (2013.01)
*G06F 30/20* (2020.01)

(52) U.S. Cl.
CPC ........ *G06F 21/554* (2013.01); *G06F 16/2455* (2019.01); *G06F 21/6245* (2013.01); *G06F 21/64* (2013.01); *G06F 30/20* (2020.01); *H04L 63/1491* (2013.01); *G06F 2221/034* (2013.01); *G06F 2221/2125* (2013.01); *G06F 2221/2127* (2013.01)

(58) Field of Classification Search
CPC .... G06F 21/60; G06F 21/554; G06F 16/2455; G06F 17/5009; G06F 21/64; H04L 63/1416; H04L 63/1491
See application file for complete search history.

(56) References Cited

U.S. PATENT DOCUMENTS

| 8,176,551 B1 * | 5/2012 | Austin .................. G06F 21/566 713/188 |
| 9,152,808 B1 | 10/2015 | Ramalingam et al. |
| 9,591,023 B1 | 3/2017 | McClintock et al. |

(Continued)

OTHER PUBLICATIONS

Arasu, Arvind et al., "DataSynth: Generating Synthetic Data using Declarative", In Proceedings of the VLDB Endowment, vol. 4, No. 12, Aug. 29, 2011, (pp. 1418-1421, 4 total pages).

(Continued)

*Primary Examiner* — Michael R Vaughan
(74) *Attorney, Agent, or Firm* — Buckley, Maschoff & Talwalkar LLC

(57) ABSTRACT

A system includes identification of a data source of a production environment, the data source storing authentic data, generation of simulated data of the data source, reception of a request for data of the data source from a requesting system in the production environment and, in response to the received request, providing of the simulated data to the requesting system. In some aspects, the simulated data is provided to the requesting system if it is determined that the request is related to an electronic attack, and the authentic data of the data source is provided to the requesting system if it is not determined that the request is related to an electronic attack.

20 Claims, 8 Drawing Sheets

(56) References Cited

U.S. PATENT DOCUMENTS

| | | | |
|---|---|---|---|
| 9,747,455 B1* | 8/2017 | McClintock | H04L 63/1441 |
| 2008/0052359 A1 | 2/2008 | Golan et al. | |
| 2014/0351924 A1* | 11/2014 | Myers | H04L 63/029 |
| | | | 726/15 |
| 2016/0330219 A1* | 11/2016 | Hasan | H04L 63/1408 |
| 2016/0359882 A1* | 12/2016 | Touboul | G06F 21/577 |
| 2017/0163682 A1* | 6/2017 | Yu | G06F 8/65 |
| 2017/0177902 A1* | 6/2017 | McClintock | G06F 21/60 |
| 2017/0310702 A1* | 10/2017 | Chantz | H04L 63/1441 |
| 2018/0083989 A1* | 3/2018 | Boss | H04L 63/1491 |
| 2018/0262529 A1* | 9/2018 | Allen | G06F 16/248 |
| 2019/0052674 A1* | 2/2019 | Wada | H04L 63/1475 |

OTHER PUBLICATIONS

"International Search Report and Written Opinion Issued in PCT Application No. PCT/US2018/057424", dated Dec. 19, 2018, 11 Pages.

* cited by examiner

DATA GENERATION FOR DATA PROTECTION

BACKGROUND

A database may store data related to organizations and/or individuals. The data may comprise sensitive information such as, for example, sales figures, corporate strategies, trade secrets, names and addresses, credit card numbers, and social security numbers. Systems are desired to protect such data from unauthorized access.

Conventional database protection systems include firewalls, access controls, event monitors, etc. These systems attempt to protect stored data by limiting database access to authorized users and/or by detecting attempts to obtain unauthorized access to a database. Conventional systems fail to address the protection of stored data once a database has been breached by an attacker.

Systems are desired to protect stored data which is accessed by an unauthorized user. Moreover, systems are desired to efficiently identify such an unauthorized user after access has occurred.

DETAILED DESCRIPTION

The following description is provided to enable any person in the art to make and use the described embodiments. Various modifications, however, will remain readily apparent to those in the art.

Generally, some embodiments provide data protection by generating simulated data and providing the simulated data to an electronic attacker. The simulated data may be provided in lieu of authentic data in response to detection of an electronic attack. An electronic attack as described herein includes any attempt, whether successful or unsuccessful, to obtain unauthorized access to data, a computing network, an endpoint device, or the like.

In some embodiments, a quantity of simulated data in a database table significantly outnumbers a quantity of authentic data, thereby constructively masking the authentic data in a case that the database table is successfully accessed by an attacker. In either case, embodiments may detect subsequent use of the simulated data by an attacker (e.g., submission of a simulated username and password) to identify the attacker and initiate suitable security measures.

Some embodiments address the technical problem of protecting stored electronic data. A technical solution to the technical problem, according to some embodiments, includes the generation of simulated data based on characteristics of authentic data to be protected, and the providing of the simulated data to an electronic attacker. The simulated data may be provided in response to detection of an electronic attack.

Figure 1:
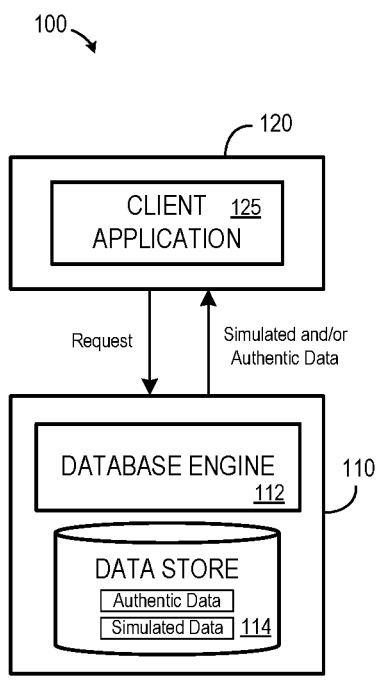
FIG. 1 is a block diagram of a system architecture implementing data protection using simulated data according to some embodiments.

FIG. 1 is a block diagram of system 100 according to some embodiments. Embodiments are not limited to the FIG. 1 system. System 100 comprises a production environment and includes data server 110 and client system 120. Accordingly, data server 110 stores authentic data for use by client system 120 in an operational (i.e., non-test) deployment.

According to some embodiments which will be described in detail below, database engine 112 generates simulated data for one or more of the database tables of data store 114. Database engine 112 may generate the simulated data according to a schedule, in response to a command from a database administrator, and/or in response to an event (e.g., a write to a database table, growth of a database table above a particular size). The simulated data may be stored in data store 114 in a manner which allows database engine 112 to distinguish the simulated data from authentic data, but embodiments are not limited thereto. In some embodiments, the database table may include significantly more simulated data than authentic data.

In some embodiments, client system 120 executes client application 125 to request data from data server 110. Data server 110 executes database engine 112 to receive the request from client system 120 (i.e., the requesting system) and retrieve data from database tables of data store 114 based on the request. Database engine 112 generates a result set and returns the result set to client application 125.

The result set provided to client application 125 may include simulated data and/or authentic data. According to some embodiments, the result set includes only simulated data if the request is determined to be related to an attempt to obtain unauthorized access (i.e., an attack) on data server 110. According to some embodiments, the request may be determined to be related to an attempt to obtain unauthorized access if the request occurs at a time when other suspicious activities are detected by data server 110 or by a threat detection system.

In one configuration, simulated data may be provided to a requester even if no attack has been detected. In one example, a database table of data store 114 stores passwords and login information. Simulated data may also be stored in the database table, such that the simulated data occupies many more rows of the database table than the authentic data. If a request is received from client application 125 for all rows of the database table, a result set including all the rows, both authentic and simulated, may be returned to client application 125. The larger quantity of simulated rows may act to obscure the authentic rows from a potential attacker, thereby protecting the authentic data.

Data server 110 may comprise any hardware system to store data and to serve requests for the stored data. Database engine 112 may support any suitable query protocols (e.g., Structured Query Language (SQL)) and may provide other suitable database management functionality. Data store 114 may comprise any one or more data sources storing any type of structured data. A hardware processing system implementing database engine 112 (e.g., a server blade) may be physically integrated with or separate from a hardware storage system (e.g., a fixed disk array, volatile random access memory) implementing data store 114.

The database tables of data store 114 may be logically interrelated via a database schema defined by metadata. The metadata may also include data protection information associated with one or more of the database tables of data store 114 as will be described below. The data protection information may indicate a degree to which the data of a database table should be protected using a system as described herein. The metadata may also be stored in data store 114.

Client system 120 may comprise, for example, a desktop computer, a laptop computer, a tablet computer, or a smartphone. Client system 120 may comprise any suitable computing device capable of executing client application 125 to request and receive a result set from data server 110. Client application 125 may comprise a data analysis application which facilitates data visualization and analysis, but embodiments are not limited thereto. According to some embodiments, client application 125 comprises a Web application executed within a Web browser of client system 120.

Figure 2:
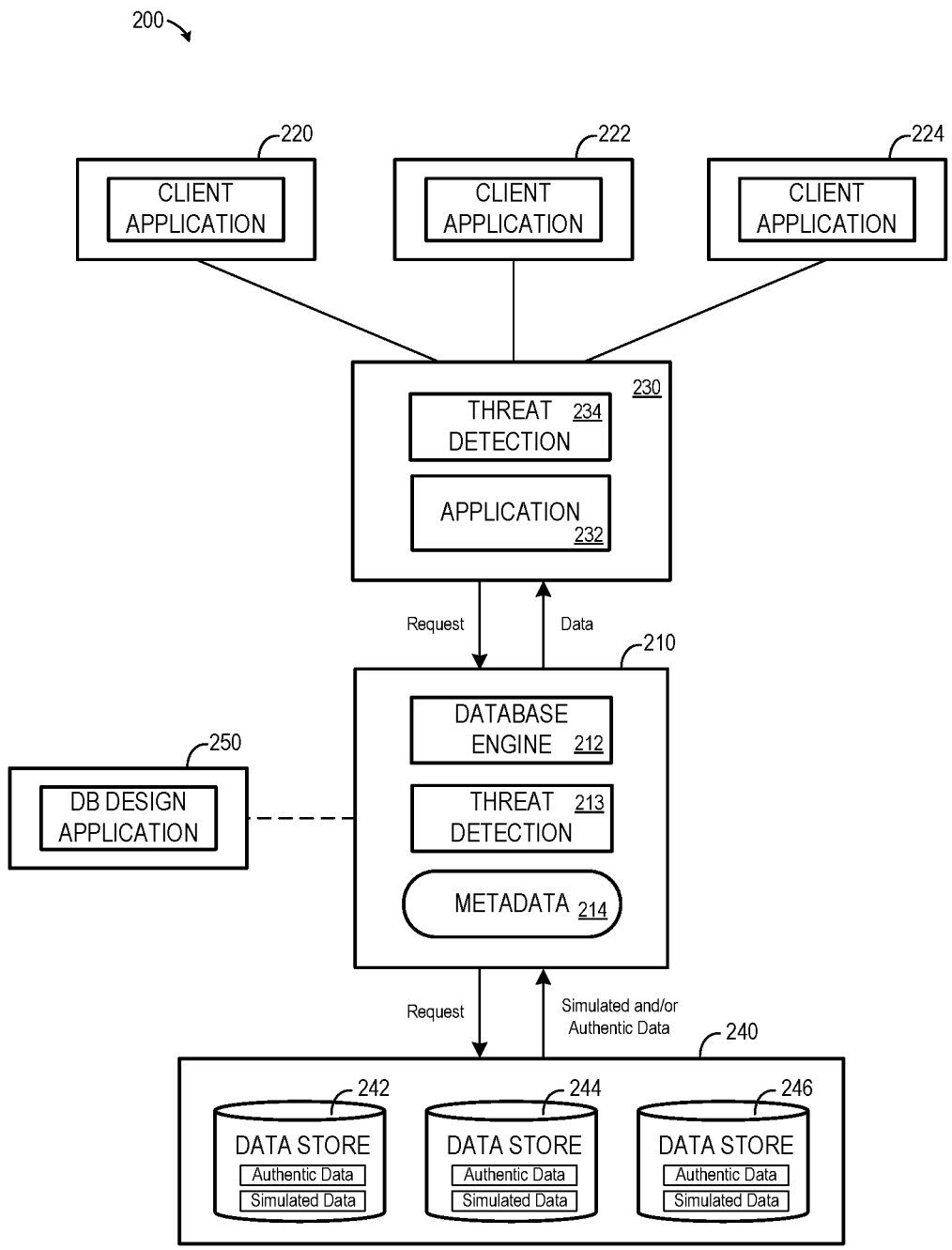
FIG. 2 is a block diagram of a system architecture implementing data protection using simulated data according to some embodiments.

FIG. 2 illustrates system 200 according to some embodiments. System 200 may comprise an implementation of system 100 but is not limited thereto. System 200 comprises a production environment including data server 210, client systems 220, 222 and 224, application server 230, data storage system 240 and development system 250. Embodiments are not limited to the architecture of system 200.

According to some embodiments, any of client systems 220, 222 and 224 may execute a respective client application to interact with application 232 executed by application server 230 and to thereby receive data from data server 210. Some embodiments may also allow direct access of data server 210 by any of client systems 220, 222 and 224, as described with respect to FIG. 1. Data server 210 and application server 230 reside on a same physical device in some embodiments.

Application server 230 comprises threat detection component 234, and data server 210 similarly includes threat detection component 213. Threat detection components 213 and 234 may operate to identify attacks or other security compromises occurring at application server 230 and/or data server 210. Threat detection component 234 and threat detection component 213 may implement any suitable threat detection techniques known in the art, and may each implement a different respective set of threat detection techniques. Components 234 and 213 may operate in conjunction with one another (and, for example, with other systems) to implement one or more threat detection techniques according to some embodiments.

Threat detection techniques may include, but are not limited to, the detection of unusual and potentially harmful attempts to access or exploit databases. Threat detection components 234 and 213 may detect, for example, suspicious database activities, anomalous database access patterns, and SQL injection attacks. Detection of suspicious database activities and anomalous database access patterns may rely in part on known user behavior analytics. SQL injection attacks inject malicious SQL statements into application entry fields, thereby breaching or modifying data in a backend database.

Threat detection may also utilize correlation of network data as is known in the art. Such detection includes correlation of event data from network components (e.g., firewalls, routers and Security Information and Event Management appliances), network servers, and external threat information to determine the presence of a threat.

Database engine 212 receives a query from application server 230 (i.e., the requesting system). Database engine 212 executes the query based on metadata 214 to generate a result set based on data stored in data storage system 240. Metadata 214 includes information specifying the structure and content of the data sources (e.g., relational database tables) stored in data stores 242, 244 and 246 and any interrelations therebetween. Metadata 214 may also associate various data protection information with one or more of the data sources (e.g., table columns) used to generate the result set. As described herein, database engine 212 may generate simulated data based on the data protection information according to some embodiments.

Development system 250 may communicate with data server 210 during design-time to configure data server 210 and to add, modify or delete metadata 214. In particular, development system 250 may execute a database design application to create or modify a data schema which logically represents the data sources of data stores 242, 244 and 246, and to specify properties of underlying database tables and attributes of table columns. These properties and attributes may include data protection information as described herein. Development system 250 may comprise any suitable computing system (e.g., desktop computer, laptop computer, tablet computer, smartphone).

Figure 3:
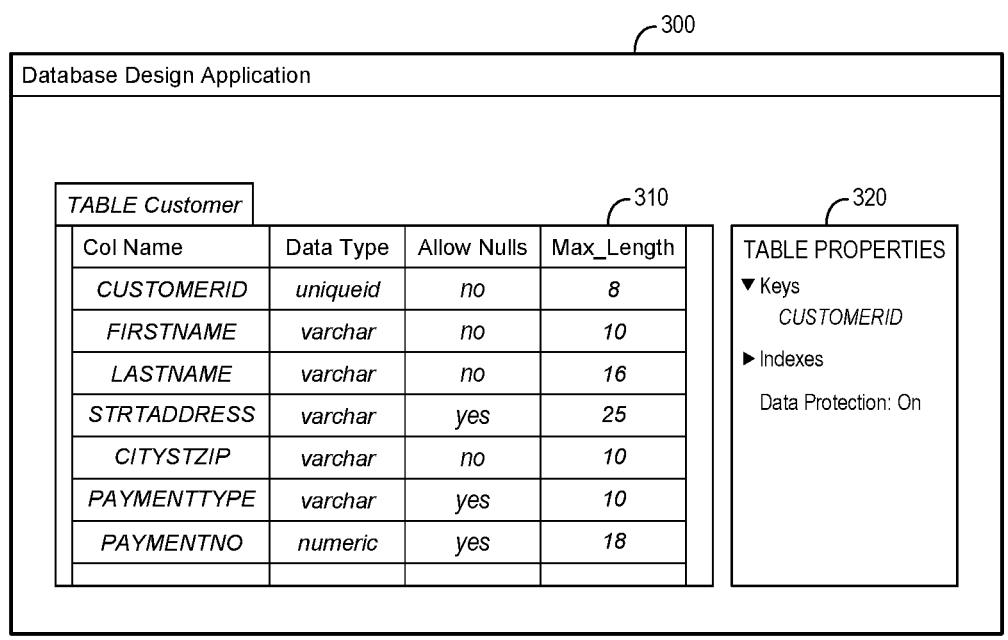
FIG. 3 is a user interface to define column attributes according to some embodiments.

FIG. 3 is a user interface presented by a display device of development system 250 during execution of a database design application according to some embodiments. User interface 300 comprises a window including metadata table 310. Metadata table 310 specifies column names for a database table entitled Customer and several attributes for each column. User interface 300 also presents various table properties in area 320. A database developer operating development system 250 may modify table 310 to create, modify or delete properties, property values, attributes and attribute values associated with the Customer table. The properties, property values, attributes and attribute values may be stored in metadata 214 as described above.

According to the illustrated example, the table properties include a Data Protection flag, the value of which is On. The Data Protection flag may be used to determine whether to generate simulated data for the database table according to some embodiments. Other systems for implementing this determination will be described below. Some embodiments may employ other data protection information.

Figure 4:
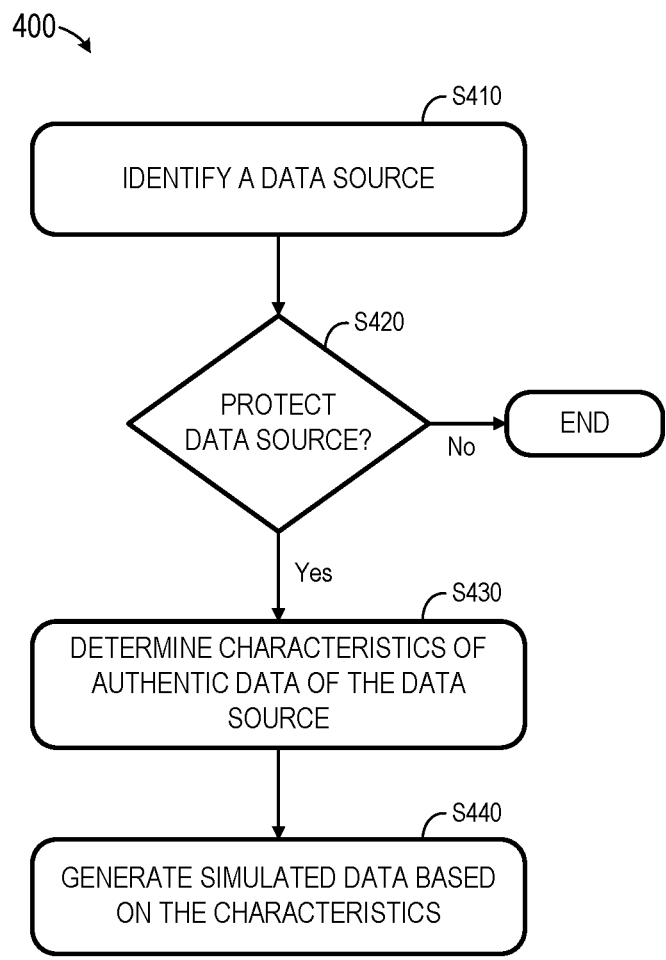
FIG. 4 is a flow diagram of a process to generate simulated data of a data source according to some embodiments.

FIG. 4 comprises a flow diagram of process 400 to generate simulated data according to some embodiments. In some embodiments, a processing unit (e.g., one or more processors, processing cores, processor threads) of a data server executes software program code to cause the data server to perform process 400. Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 400 may be executed by any suitable element of a database and/or application platform, including but not limited to a database management system, a database security component, an application security component, and a database application. Process 400 may be executed according to a defined temporal schedule, in response to a command from a database administrator, and/or in response to a detected event (e.g., a write to a database table, growth of a database table above a particular size, a detected increased threat level).

Initially, a data source is identified at S410. If process 400 is initiated with respect to a particular database table (e.g., in response to a received administrator command to protect the particular database table, in response to access of the particular database table, or in response to growth of the particular database table) the identified data source is the particular database table. If process 400 is initiated more generally (e.g., by a scheduled job, due to a detected increased threat level) the data source may be selected from a set of potential database tables to protect, such as all client-accessible database tables.

Next, at S420, it is determined whether to protect the identified data source as described herein. The determination may be based on table metadata. With respect to FIG. 3, the determination at S420 may be based on the value (i.e., On) of the Data Protection flag associated with the database table. According to some embodiments, the determination at S420 may be based at least in part on column names of the data source. For example, a database table including columns named "Password", "SocialSecurityNumber" or the like may be identified for protection at S420.

The determination at S420 may also be based on column attribute values according to some embodiments. For example, a column attribute value specified in metadata may define a sensitivity or confidentiality of the information within the column, as described with respect to FIG. 3. The column attribute value may indicate a degree to which associated data should be protected from unauthorized access and/or disclosure. Various columns may be associated with different column attribute values. It may therefore be determined to protect a database table at S420 based on the sensitivity and/or confidentiality of the values of its constituent columns, as indicated by its associated column metadata.

Assuming the determination at S420 is affirmative, characteristics of authentic data of the data source are determined at S430. Characteristics may include the type of data found in each column (e.g., dates, ages), the distinctness of such data, any alphanumeric patterns within each column (e.g., telephone number formats), relationships between values of different columns within a same row, column names, and any other constraints which may be helpful to generate simulated data for each column. A threshold number of rows may be required in order to determine such patterns and relationships. In some embodiments, the characteristics may be determined simply based on the column names (e.g., SocialSecurityNumber).

Simulated data is generated based on the determined characteristics at S440. The simulated data may comprise additional rows of the database table. According to some embodiments, the simulated rows are stored in the subject database table along with its authentic rows. As will be described below, in some embodiments the simulated rows may be generated and used on-the-fly, and not persisted in the data store.

Generation of simulated database table rows based on the characteristics of authentic table rows is well-known in the art. For example, static data masking is currently used to build development and test datasets which are similar to datasets of production databases. Embodiments are not limited to generating the simulated data based on determined characteristics of authentic data.

According to some embodiments, the simulated data is identifiable as simulated data. In one example, a separate database table is populated with the keys of the simulated data (or, alternatively, with the keys of the authentic data).

In some embodiments, a simulated row is generated at S440 and a hash function is applied to the data of the simulated row. If the hashed value of the data is equal to a pre-specified value (or falls within some pre-specified range of values), the simulated row is used as described herein (e.g., stored in the database table). If not, the simulated row is discarded. Consequently, simulated rows may be identified by reference to table metadata which specifies the permitted hash value (or range of values).

Figure 5:
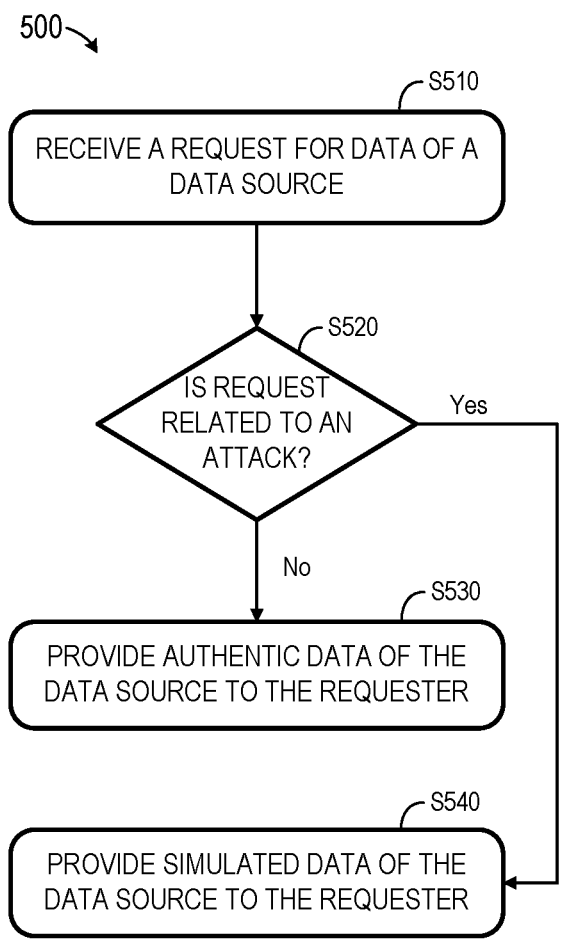
FIG. 5 is a flow diagram of a process to provide either authentic data or simulated data of a data source according to some embodiments.

FIG. 5 illustrates process 500 to utilize simulated data in response to an attack according to some embodiments. Initially, at S510, a request for data of a data source is received. The request may be received from a client system or from an intermediate system (e.g. application server 230) disposed between various client systems and a data server. According to some embodiments, the request is a database query (e.g., an SQL script). The request may be for data stored in one of more database tables as is known in the art.

Next, at S520, it is determined whether the request is related to an attack on the data source/data server. As described above, embodiments may provide detection of unusual and potentially harmful attempts to access or exploit the data source. For example, the determination at S520 may be affirmative if threat detection components of the system detect an SQL injection attack associated with the request. In another example, the request may be determined to be related to a brute force attack at S520. In this regard, threat detection components may determine the request to be related to a brute force attack if the request was received from a client system which submitted many unsuccessful login attempts until a last successful login attempt.

An affirmative determination at S520 may result from detection of any other suspicious network activities or anomalous database access patterns. For example, it may be determined that the request is related to an attack if the request is for large amounts of data, but not for backup purposes. In this regard, if a backup request is received from a suspicious or non-whitelisted IP address, it may be determined at S520 that the request is related to an attack.

Flow proceeds from S520 to S530 if it is determined that the request is not related to an attack. At S530, authentic data fulfilling the request is provided to the requester. If the request is a query script, the data server executes the script based on a database schema and on metadata further describing the underlying database tables, and returns a result set based on the authentic data stored in the data source. Any rows of simulated data may be identified (e.g., based on key entries of a separate table or a hash function as described above) and ignored during generation of the result set at S530.

If it is determined at S520 that the request is related to an attack, simulated data of the data source is provided to the requester at S540. Similarly to S530, the data server executes the script based on the database schema and the metadata further describing the underlying database tables. Unlike conventional operation, only rows of simulated data are used to generate the result set. The rows of simulated data may be detected based on key entries of a separate table, a hash function, or other suitable identification mechanism.

The result set may combine data from several source database tables. One or more of the source database tables may include rows of simulated data and/or rows of authentic data. In some embodiments, the result set is generated based on only the rows of simulated data of the former tables and the rows of authentic data of the latter tables. The latter tables may be unprotected by simulated data due to the lack of sensitivity of their content.

According to some embodiments, S540 includes determination of the underlying source tables of the result set, identification of any source tables which should be protected (e.g., as described with respect to S420), and on-the-fly generation of simulated rows of the identified source tables for use in generating the result set. The thusly-generated simulated rows may or may not be persisted in their associated database tables.

Process 500 may be executed to efficiently address data breaches and protect authentic data from unauthorized access. Advantageously, authentic data and authorized users are unaffected.

Figure 6:
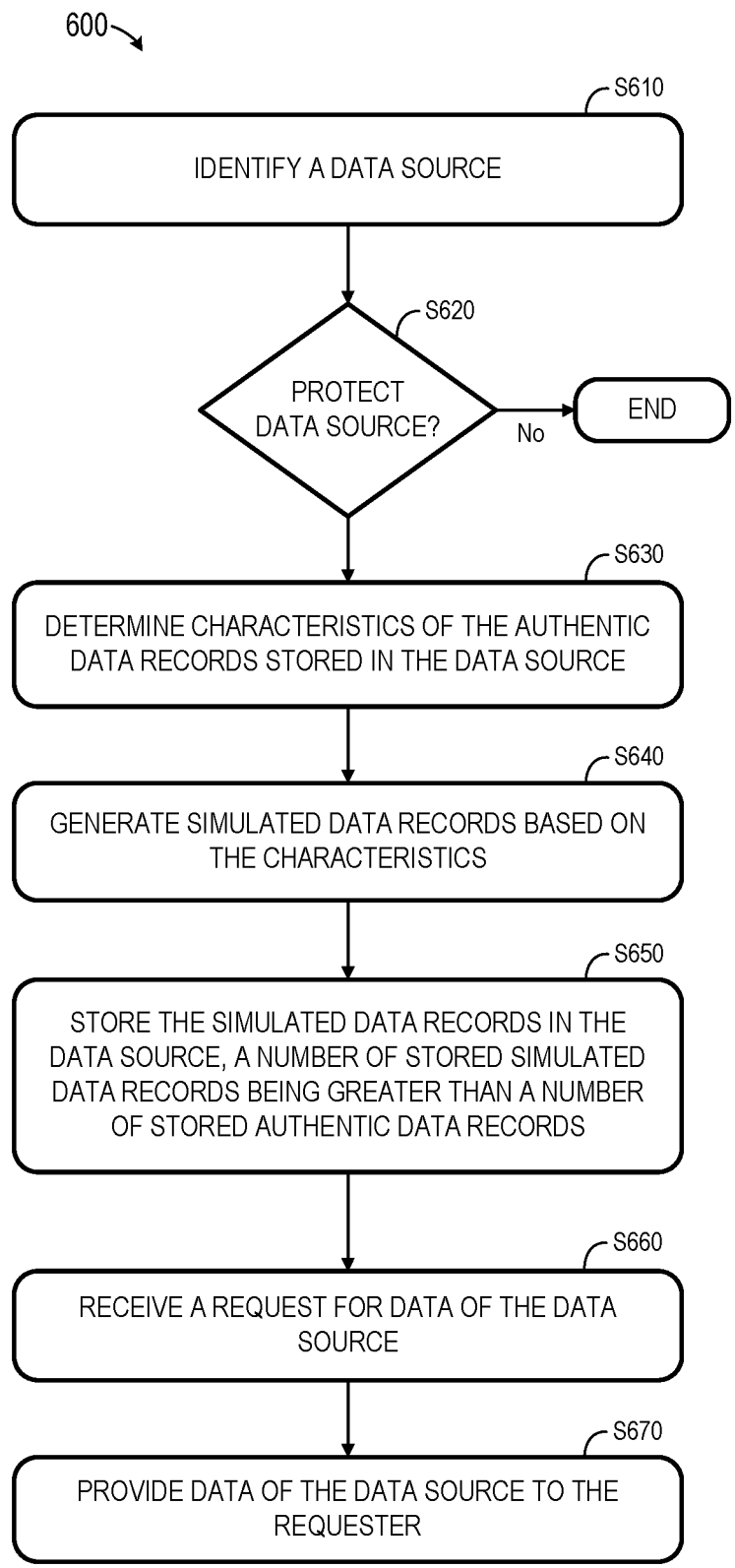
FIG. 6 is a flow diagram of a process to provide simulated data of a data source according to some embodiments.

FIG. 6 is a flow diagram of process 600 according to some embodiments. Process 600 may be executed to protect data even if an attack is not detected.

S610 and S620 may proceed as described above with respect to S410 and S420 to identify a data source and determine whether the data source should be protected. If it is determined at S620 to protect the data source, characteristics of authentic data records of the data source may be determined at S630 as described above with respect to S430.

Simulated data records are generated based on the determined characteristics at S640, and stored in the subject data source at S650. The number of generated and stored simulated data records may vastly outnumber the number of authentic data records of the data source. For example, in a case that the subject data source is a password table, the ratio of simulated data records to authentic data records may be 100 to 1 or higher. The generated data records may or may not be identified as simulated as described above.

A request for data of the data source is received at S660. The request may request a result set which is based at least in part on data of the data source. The data of the data source is provided to the requester at S670. In particular, a result set is generated based on the data of the data source and returned to the requester as is known in the art.

Process 600, in some embodiments, does not distinguish between valid requests and requests related to an attack. Rather, some embodiments of process 600 protect data by providing significantly more simulated data than authentic data, thereby hindering identification of the authentic data. Moreover, if any of the simulated data is subsequently used by a client system (e.g., a simulated username and password), such use identifies the client system as potentially unsafe. Such a client system may be subsequently blocked or provided with simulated data per process 500.

Some database tables, such as password tables, include authentic records which are occasionally modified. According to some embodiments of process 600, simulated records of such a database table are identified in a separate database. Periodically, the separate database is used to identify and change the simulated records of the subject database. An attacker is thereby prevented from identifying the simulated records by determining which records of the subject database have not changed over time.

Figure 7:
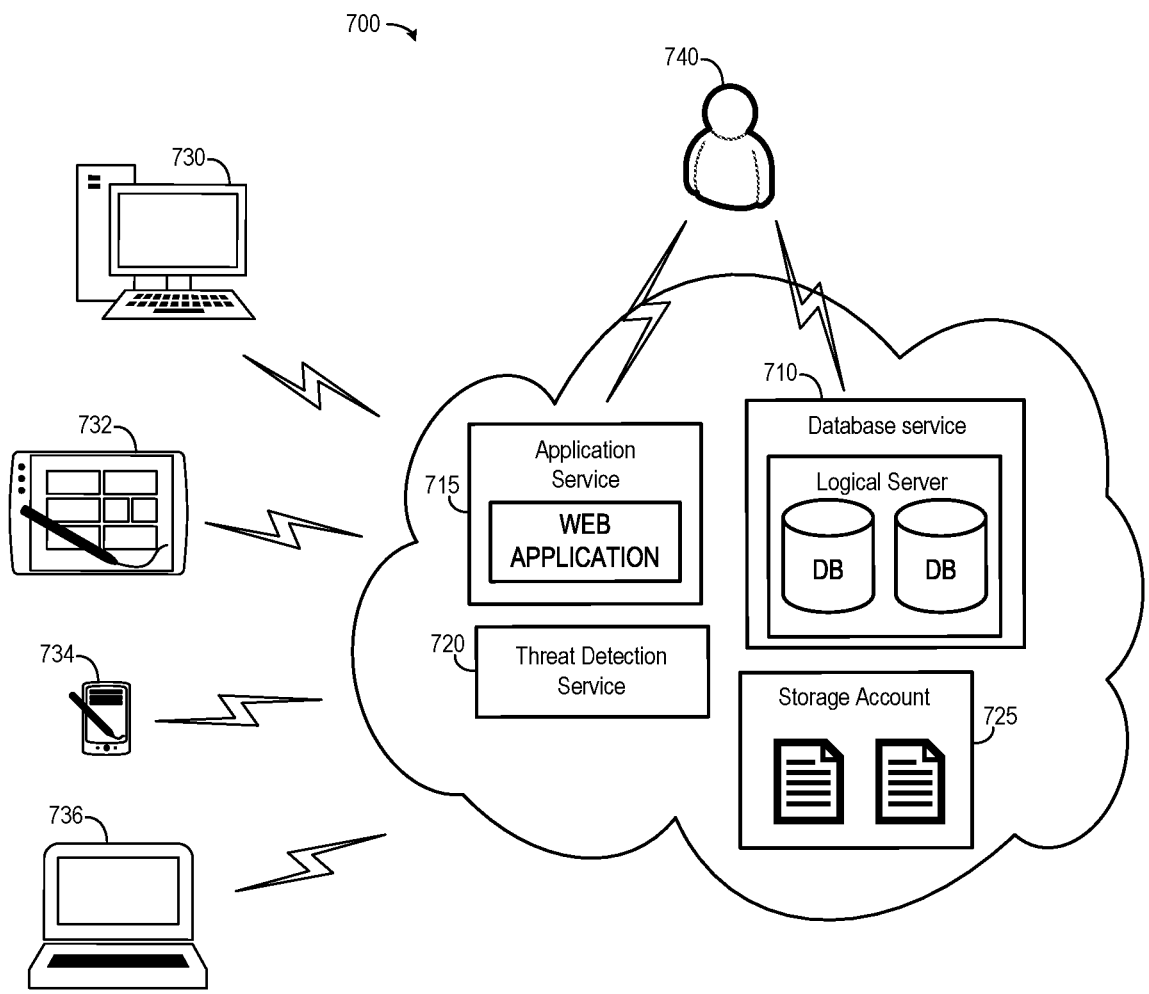
FIG. 7 is a block diagram of a cloud-based system architecture implementing data protection using simulated data according to some embodiments.

FIG. 7 is a block diagram of system architecture 700 according to some embodiments. Architecture 700 includes database service 710, application service 715, threat detection service 720 and storage account 725. As illustrated, architecture 700 may comprise a cloud-based implementation of some embodiments. Each of the elements of architecture 700 may comprise one or more computer servers executing one or more applications. Architecture 700 may be implemented using any number and type of public and/or private networks.

Database service 710 may comprise a relational database-as-a-service in the cloud. Database service 710 may host one or more databases within a logical server. Application service 715 may comprise a platform supporting the development and deployment of Web applications, and storage account 725 may comprise blob containers to store audit logs and/or other logs.

Database service 710 may store and provide authentic data to any of client systems 730 through 736 as is known in the art. For example, one of client systems 730 through 736 may execute a Web browser to request data from a Web application deployed by application service 715. In response, application service 715 requests a result set from database service 710, database service 710 generates and returns the result set, and application service 715 transmits the result set to the requesting client system.

Database service 710 may generate and provide simulated data as described herein. Database service 710 may persist the simulated data and/or generate the simulated data on-the-fly. Database service 710, in conjunction with threat detection service 715, may determine that a request (e.g., received from user 740) is related to an attack on, for example, application service 715 or database service 710. In response, database service 710 may provide only simulated data of protected database tables in response to the request.

Database service 710 and/or application service 715 may generate entries for an audit log of storage account 725. The audit log may be used to detect an attack in some embodiments.

Figure 8:
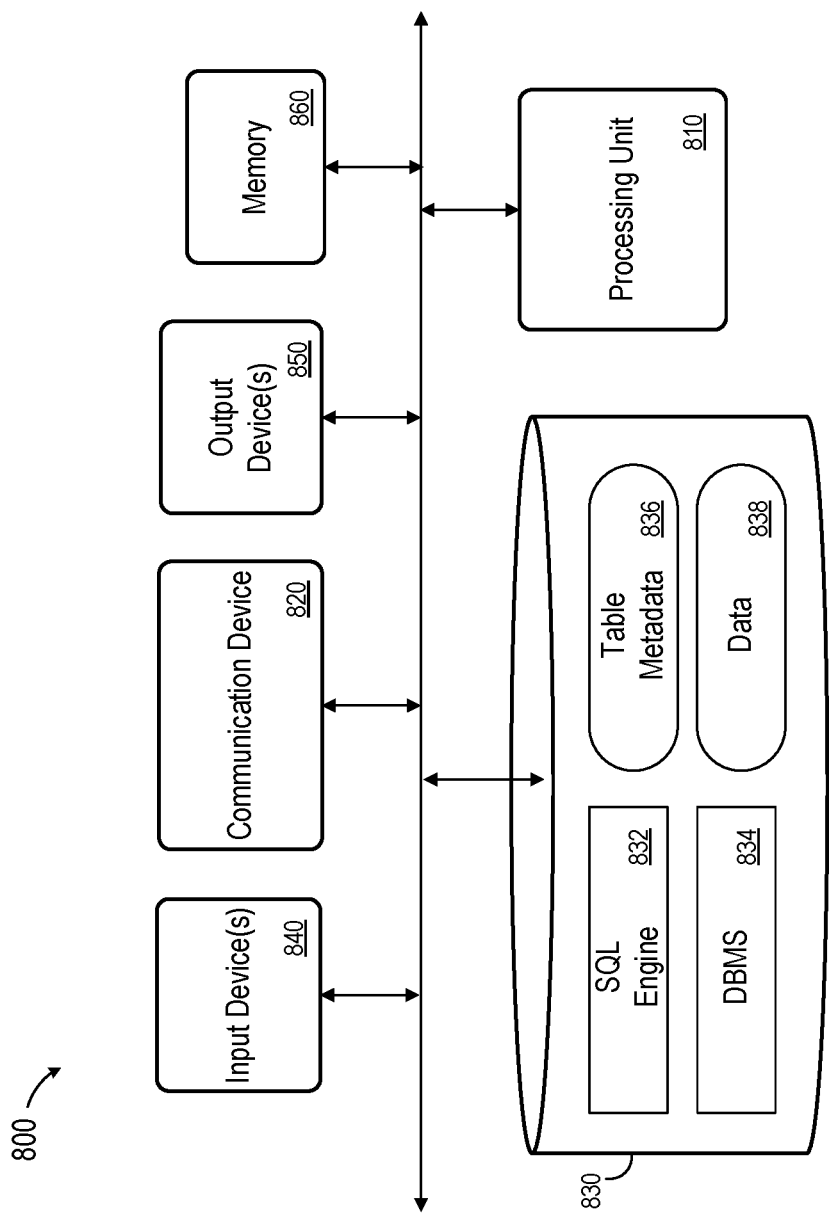
FIG. 8 is a block diagram of an apparatus implementing data protection using simulated data according to some embodiments.

FIG. 8 is a block diagram of system 800 according to some embodiments. System 800 may comprise a general-purpose computer server and may execute program code to perform any of the functions described herein. System 800 may include other unshown elements according to some embodiments.

System 800 includes processing unit 810 operatively coupled to communication device 820, persistent data storage system 830, one or more input devices 840, one or more output devices 850 and volatile memory 860. Processing unit 810 may comprise one or more processors, processing cores, etc. for executing program code. Communication device 820 may facilitate communication with external devices, such as an external network in communication with the Web. Input device(s) 840 may comprise, for example, a keyboard, a keypad, a mouse or other pointing device, a microphone, a touch screen, and/or an eye-tracking device. Output device(s) 850 may comprise, for example, a display (e.g., a display screen), a speaker, and/or a printer.

Data storage system 830 may comprise any number of appropriate persistent storage devices, including combinations of magnetic storage devices (e.g., magnetic tape, hard disk drives and flash memory), optical storage devices, Read Only Memory (ROM) devices, etc. Memory 860 may comprise Random Access Memory (RAM), Storage Class Memory (SCM) or any other fast-access memory.

SQL Engine 832 and database management system 834 may comprise program code executed by processing unit 810 to cause system 800 to perform any one or more of the processes described herein. For example, execution of SQL engine 832 may cause generation of simulated data and providing of simulated data to a requestor. In this regard, table metadata 836 and data 836 may store metadata and data (i.e., authentic and simulated) as described herein. The data and metadata may be persisted in data storage system 830 and/or loaded into memory 860 during operation. Data storage device 830 may also store data and other program code for providing additional functionality and/or which are necessary for operation of system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
  a data storage system storing database tables, each of the database tables including authentic data;
  a memory device storing processor-executable process steps; and
  a processor to execute the processor-executable process steps to cause the system to:
    generate simulated data records based on authentic data records of a database table stored in the data storage system, the authentic data records being periodically-modified;
    store the simulated data records in the database table with the periodically-modified authentic data records;
    periodically identify the simulated data records stored in the database table and, in response to each periodic identification of the simulated data records, modify only the identified simulated data records and not the periodically-modified authentic data records;
    receive a request for data of the database table from a requesting system;
    determine if the request is related to an electronic attack; and
    based at least on a determination that the request is related to an electronic attack, provide the simulated data records stored in the database table to the requesting system.

2. A system according to claim 1,
  wherein the authentic data records of the database table are provided to the requesting system if it is not determined that the request is related to an electronic attack.

3. A system according to claim 2, the processor to further execute the processor-executable process steps to cause the system to:
  store metadata identifying the simulated data records,
  wherein the simulated data records are provided to the requesting system based on the metadata.

4. A system according to claim 2, wherein generation of the simulated data records comprises:
  generation of the simulated data records based on a hash function,
  wherein providing of the simulated data records comprises application of the hash function to records of the data source to identify the simulated data records.

5. A system according to claim 1, wherein the simulated data records of the database table are generated based on characteristics of the authentic data of the database table.

6. A system according to claim 1,
  wherein a number of simulated data records stored in the database table is greater than a number of authentic data records stored in the database table.

7. A system according to claim 6, the processor to further execute the processor-executable process steps to cause the system to:
  store, in a second database table, identifiers of the simulated data records,
  wherein the simulated data records are identified based on the identifiers.

8. A system according to claim 6, wherein generation of the simulated data records comprises generation of rows of simulated data based on a hash function, and the processor to further execute the processor-executable process steps to cause the system to:
  wherein the simulated data records are identified based on the hash function.

9. A system according to claim 1, wherein the request defines a result set and two or more database tables, and wherein one of the two or more database tables does not include simulated data records, the processor to further execute the processor-executable process steps to cause the system to:
  generate the result set based on authentic data records of the one of the two or more database tables and the simulated data records of the data source, and
  wherein providing of the simulated data records to the requesting system comprises providing of the result set to the requesting system.

10. A computer-implemented method comprising:
  identifying a database table of a production environment, the database table storing authentic data records;
  generating simulated data records based on the authentic data records of the database table, the authentic data records being periodically-modified;
  storing the simulated data records in the database table with the periodically-modified authentic data records;
  periodically identifying the simulated data records stored in the database table and, in response to each periodic identification of the simulated data records, modifying only the identified simulated data records and not the periodically-modified authentic data records;
  receiving a request for data of the database table from a requesting system in the production environment;
  determining if the request is related to an electronic attack; and
  based at least on a determination that the request is related to an electronic attack, providing the simulated data records stored in the database table to the requesting system.

11. A method according to claim 10,
  wherein the authentic data records of the database table are provided to the requesting system if it is not determined that the request is related to an electronic attack.

12. A method according to claim 11, further comprising:
  storing metadata identifying the simulated data records,
  wherein the simulated data records are provided to the requesting system based on the metadata.

13. A method according to claim 11, wherein generating the simulated data comprises:
generating simulated data records based on a hash function,
wherein providing the simulated data records comprises applying the hash function to records of the database table to identify the simulated data records.

14. A method according to claim 10, wherein a number of simulated data records stored in the database table is greater than a number of authentic data records stored in the database table.

15. A method according to claim 14, further comprising:
storing, in a second database table, identifiers of the simulated data records,
wherein the simulated data records are identified based on the identifiers.

16. A method according to claim 10, wherein the request defines a result set and two or more database tables, and wherein one of the two or more database tables does not include simulated data records, further comprising:
generating the result set based on authentic data records of the one of the two or more database tables and the simulated data records of the database table, and
wherein providing of the simulated data records to the requesting system comprises providing of the result set to the requesting system.

17. A non-transitory computer-readable medium storing processor-executable code, the code executable by a processing unit to cause a computing system to:
identify a database table of a production environment, the database table storing authentic data records;
generate simulated data records based on the authentic data records of the database table, the authentic data records being periodically-modified;
store the simulated data records in the database table with the periodically-modified authentic data records;
periodically identify the simulated data records stored in the database table and, in response to each periodic identification of the simulated data records, modify only the identified simulated data records and not the periodically-modified authentic data records;
receive a request for data of the database table from a requesting system in the production environment;
determine if the request is related to an electronic attack; and
based at least on a determination that the request is related to an electronic attack, provide the simulated data records stored in the database table to the requesting system.

18. A medium according to claim 17,
wherein the authentic data records of the database table are provided to the requesting system if it is not determined that the request is related to an electronic attack.

19. A medium according to claim 17,
wherein a number of simulated data records stored in the database table is greater than a number of authentic data records stored in the database table.

20. A medium according to claim 19, the code executable by a processing unit to cause a computing system to:
store, in a second database table, identifiers of the simulated data records,
wherein the simulated data records are identified based on the identifiers.

* * * * *